UNITED STATES PATENT OFFICE.

WILHELM HELM, OF BERLIN, GERMANY.

PROCESS OF CHILLING BUTTER.

SPECIFICATION forming part of Letters Patent No. 658,369, dated September 25, 1900.

Application filed April 14, 1900. Serial No. 12,917. (No specimens.)

*To all whom it may concern:*

Be it known that I, WILHELM HELM, a subject of the King of Prussia, residing at Anhaltstrasse 12, Berlin, Germany, have invented certain new and useful Improvements in Processes of Chilling Butter; and I do hereby declare the following to be a full, clear, and exact description of the invention, such as will enable others skilled in the art to which it appertains to make and use the same.

My invention consists of a new and useful process of cooling butter while it is being originally manufactured by introducing milk-ice during the churning.

The method of cooling butter for the purpose of its transportation generally employed heretofore consisted of putting up the butter (ready for its transportation) in tubs or casks placed in cold rooms. It is obvious that by this method an excessively-great quantity of cold must be generated in order to insure successful cooling, for, first, the cold must penetrate the wooden walls of the butter-tubs; second, the butter itself being a poor conductor of cold the latter requires considerable time to penetrate to the middle of the butter-tubs, while, consequently, the outer portion of the butter within the tub is reduced to a lower temperature than the central part thereof, and, third, it is necessary to first cool the room employed, including its entire wall-surface, before the cooling of the butter begins. Furthermore, it has been proposed to cool butter while it is being originally manufactured by introducing water-ice during the churning. From this process, however, there did not, of course, result a good yield and a good quality of the butter.

According to English Patent No. 15,161/93 milk or cream ice is to be produced in order to preserve milk and cream for a length of time, whereby, of course, a separation of milk-fat is not to be effected or intended, and a larger quantity of frozen milk or cream of the same quality as the product to be preserved is to be employed. By my process I chill down the milk or cream, preferably to a low degree, by introducing milk-ice before bringing the fat of the milk into a compact mass, so that by my process the lower temperature is not to be permanently maintained and milk-ice can be used for cooling while making butter from cream.

In carrying out my invention I proceed as follows: Cream, whole milk, skimmed milk, or buttermilk is frozen and the pieces of the milk-ice (cream-ice and buttermilk-ice are also to be here understood as included by the term "milk-ice") formed thereby are added to the butter-fat to be solidified. This may be done by placing the milk-ice in a churn, pouring the butter-fat to be solidified therein, and then simultaneously setting the paddles of the churn in motion. In this manner the butter is cooled to a great extent *in statu nascendi,* so that when it leaves the churn it has already the low degree of temperature which has been heretofore obtained only after the troublesome and complicated process of cooling from the outside.

The quality in relation to the amount of water and the yield of the butter are of course the same as in operating with pure milk and of course better than when operating with pieces of water-ice.

The quantity of milk-ice to be used depends naturally upon the temperature which the butter-fat had at the beginning of the process and also upon the temperature which it is desired to give the butter. Questions relating to the temperature, as well as to the quantity of cream or milk ice in which the butter-fat to be solidified is distributed in the beginning of the process, can be easily determined when it is taken into consideration that one kilogram of milk-ice affords for melting without loss eighty thermal units.

It has been proved by experience that butter manufactured by my improved process is exceedingly durable and less affected by warmth than that made by the ordinary methods.

Having now described my invention, I claim as new and desire to secure by Letters Patent—

A new and useful process of producing butter, consisting in introducing frozen cream, milk, skimmed milk or buttermilk into the milk or cream to be churned in order to obtain suitable temperatures for the churning, as well as finer and more durable butter, and churning the resulting mixture.

In testimony whereof I affix my signature in presence of two witnesses.

WILHELM HELM.

Witnesses:
MAX C. STACHLER,
HENRY HASPER.